INVENTOR.

Richard Friedrich Josef Filipowsky

BY

Wenderoth, Lind & Ponack

ATTYS.

March 24, 1959 R. F. J. FILIPOWSKY 2,879,336

ELECTRIC MULTICHANNEL PULSE COMMUNICATION SYSTEM OPERATING IN TIME DIVISION

Filed May 16, 1956 4 Sheets-Sheet 2

INVENTOR.
Richard Friedrich Josef Filipowsky,
BY Wenderoth, Lind & Ponack
ATTYS.

March 24, 1959 R. F. J. FILIPOWSKY 2,879,336

ELECTRIC MULTICHANNEL PULSE COMMUNICATION SYSTEM OPERATING IN TIME DIVISION

Filed May 16, 1956 4 Sheets-Sheet 3

INVENTOR.
Richard Friedrich Josef Filipowsky,
BY
Wenderoth, Lind & Ponack
ATTYS.

March 24, 1959

R. F. J. FILIPOWSKY 2,879,336

ELECTRIC MULTICHANNEL PULSE COMMUNICATION SYSTEM OPERATING IN TIME DIVISION

Filed May 16, 1956

4 Sheets-Sheet 4

INVENTOR.
Richard Friedrich Josef Filipowsky
BY
Wenderoth, Lind & Ponack
ATTYS.

United States Patent Office 2,879,336

Patented Mar. 24, 1959

2,879,336

ELECTRIC MULTICHANNEL PULSE COMMUNICATION SYSTEM OPERATING IN TIME DIVISION

Richard Friedrich Josef Filipowsky, Glen Burnie, Md., assignor to Companhia Portuguesa Radio Marconi, S.A.R.L., Lisbon, Portugal Application May 16, 1956, Serial No. 585,207

Claims priority, application Portugal June 20, 1955

10 Claims. (Cl. 179—15)

The present invention relates to an electric multichannel impulse communication system with redundancy reducing characteristics.

It is well known that in normal pulse position modulation systems all channels are sampled at regular intervals in a given cyclical sequence. A synchronising or marker pulse initiates each new period of this sampling cycle and a constant fraction of the full sampling period is reserved for each channel pulse. The exact position of the channel pulse within this interval expresses the instantaneous value of the input waveform of a given channel.

The disadvantage of such a continuous pulse position modulation (PPM) system, is the fact that the uncertainty of the exact position of a pulse, due to noise affecting its leading and trailing edge produces a certain amount of unavoidable noise which will accumulate on long distance communication links.

Improved signal to noise characteristics can be achieved when quantizing the input waveform and allotting to each of its amplitude levels one elementary time-interval, being called one time-quantum, of the given modulation range of a channel pulse. Regenerative repeaters can produce at intermediate points of a long distance communication link new channel pulses exactly at the center of the corresponding elementary time-interval and the uncertainty of the position of a pulse can be eliminated. However, to avoid undue quantization noise a large number of quantum levels is required and this in turn increases the required modulation interval beyond practicable limits. Pulse code modulation (PCM) is then more economical, but it requires several pulses per channel interval thus increasing the average transmitter power.

A certain small improvement in the overall system capacity may be secured, when using a modulation system known as pulse interval modulation (PIM). In this system it is not the exact position of the channel pulse within a fixed modulation interval, but the interval between two adjacent channel pulses which carries the information of a particular channel. This system has the advantage, that the total period of one modulation cycle will be shorter than in the analogue PPM system but it will however be inconstant. It will be shortest, when all channels should carry simultaneously a very small modulation level and it will be longest, when all channels should carry simultaneously a very high modulation level. In the average it will be half the time of the corresponding PPM system.

In all the above systems there are no provisions for reducing the redundancy of the information flux of the individual channels.

A pulse communication system with improved transmission characteristics has been described in my United States Patent No. 2,676,202 granted April 20, 1954. This system operates with varying impulse repetition frequency and reduces automatically the transmission capacity of a channel by reducing its sampling rate, whenever the instantaneous complexity of the input waveform is low. This system operates very efficiently for certain types of input waveforms like speech signals, etc., but it produces a sampling noise whenever the sampling rate falls below the cut-off frequency of the smoothing low-pass filter in the receiver demodulator. Such sampling noise can only be reduced by complicated devices.

A further shortcoming of the above-mentioned system is the fact that each sample requires a channel mark, thus increasing the required transmission capacity whenever the sampling rate approaches the normal rate of a synchronous system (twice the highest modulation frequency).

It is an object of the present invention to provide an improved system of pulse position modulation, which in combination with known principles of interval modulation offers the advantage of redundancy reducing characteristics.

It is a further object of the present invention to provide asynchronous operation of one, several or all of the channels without requiring the wasteful transmission of channel marks along with the amplitude samples.

It is another object of the invention to provide an improved system of pulse code modulation requiring less channel capacity than normal pulse code modulation but retaining the advantage of using exclusively binary signal elements. Regenerative repeaters can thus be applied without difficulty.

It is a still further object of the invention to provide an improved system of interval modulation which operates in perfectly quantized form including quantization in the time domain and which secures the same duration of all complete pulse trains (sampling cycles) and still requires much less transmission capacity than an ordinary pulse position modulation system.

According to the present invention the equipment at the transmitting side comprises a number of line-amplifiers, one for each channel, feeding a time quantizer in each channel.

It is an object of these time quantizers to determine at the correct instant the instantaneous value of the channel signal.

A central timer produces trigger pulses to provide the correct interleaving of all the channel pulses. The first trigger pulse causes the marker signal generator to produce a specially shaped marker signal. At its end the central timer triggers the time quantizer of channel 1 and the latter produces after a specified number of time quanta another trigger signal which activates the time quantizer of channel 2. After a specified number of time quanta this time quantizer triggers the time quantizer of channel 3 and so on until finally the time quantizer of channel $n$ is triggered.

It is a further object of said time quantizers to adjust automatically said specified number of time quanta in relation to the instantaneous value of the channel signal following a predetermined rule of correlating signal value to the number of time quanta. It is another object of the time quantizer to adjust a particular number of time quanta and to give simultaneously a special signal to an electronic switch, whenever the instantaneous value of the channel signal does not correspond to one of the predetermined numbers of time quanta.

The equipment at the transmitting side comprises further an electronic switch and a pulse modulator, both units being common to all the channels. This electronic switch is triggered from the time quantizer of channel $n$ after all channel pulses of the PIM train have been ordinarily produced. Its object is to sample all those channels which have previously produced in their time quantizers said special signals and communicated them to the electronic switch. All these samples are switched in a given sequence to said pulse modulator, the output of which is combined with the output of all the time quantizers to the complete multiplex train. For radio transmission there is provision for an output amplifier to feed the multiplex train to the carrier modulator, provision for a carrier oscillator (master oscillator) and for a number of radio frequency amplifiers for securing the required output power of the modulated wave.

The equipment at the receiving side comprises a video amplifier to feed the multiplex train from the radio frequency demodulator or from any line to the channel distributing equipment. The latter comprises a marker signal selector, a gate to select the PIM train, and a second gate to select the additional modulated pulses. The channel distributing equipment comprises further for each channel one flip-flop circuit, one or more selectors for special numbers of time quanta and one pulse time demodulator. Common to all channels is a pulse demodulator and an electronic switch for distributing the output of said pulse demodulator to those channels, which causes at the transmitting side said electronic switch to sample them. It comprises finally one out-put device with low-pass filter characteristic in each channel output.

According to a feature of the invention, said pulse modulator and demodulator operate in the pulse code modulation system.

According to another feature of the invention, said pulse modulator produces along with each modulated pulse a special channel marker signal in correspondence with the number of the channel from which the sample is taken. This pulse demodulator at the receiving side comprises means to identify said channel marker signal and means to cause said electronic switch to connect the demodulated pulse (sample) to the correct out-put channel.

According to another feature of the invention, the central timer at the transmitting side produces also a "stop signal" which causes said electronic switch to discontinue its action at a predetermined time after the synchronization signal had been generated, thus keeping all complete cycles of the multiplex train of constant duration. The electronic switch at the transmitting side has a priority selecting characteristic and the time quantizers are associated with complexity meters similar to the equipment proposed in the above-mentioned United States Patent 2,676,202.

According to still another feature of the invention, the time quantizers comprise means to store any sample of each channel for at least one sampling period and means to form the difference of the value of the stored sample against the value of the next sample. Accordingly, only the difference values are transmitted by the above described system of efficient pulse communication. The out-put devices with low-pass characteristics at the receiving side comprise means to store at least one sample of the channel signal, means to combine said stored sample with the received difference signal and means to store in place of the previous sample said combined sample.

According to a further feature of the invention, the equipment at the receiving side comprises an electronic counter associated with the first gate, which triggers an opening pulse for the second gate only after counting the correct and predetermined number of pulses during the PIM-train. The equipment at the receiving side also comprises delay circuits and a third gate to permit the rejection of a complete multiplex cycle whenever the counting action does not produce the correct number of pulses.

The invention will now be described by way of example with reference to the ccompanying drawings, in which.

Figure 1:
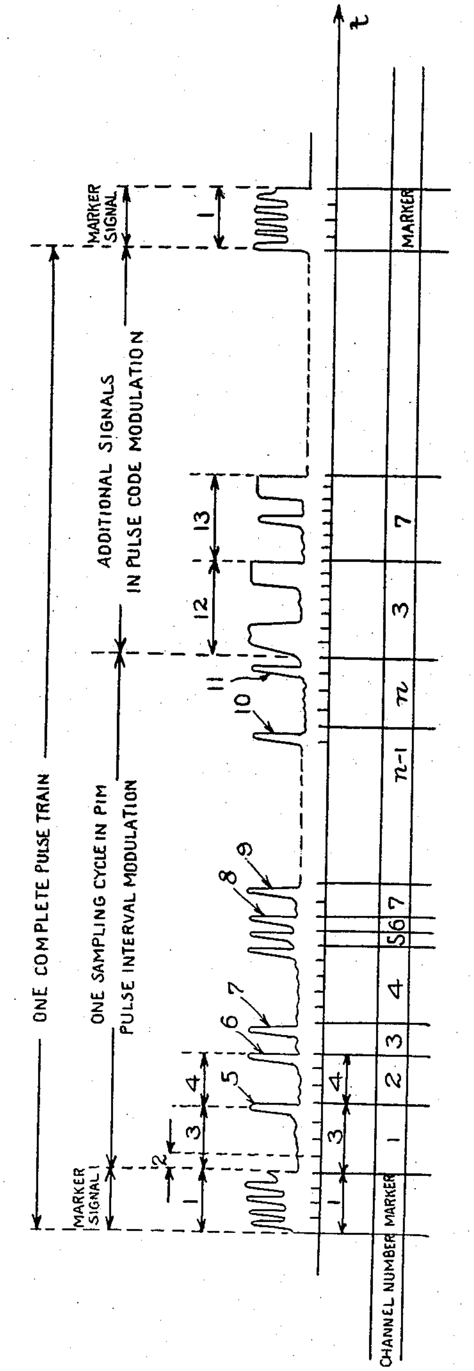
Fig. 1 is an example of a typical cycle of the multiplexed pulse train.

Referring to Fig. 1, this illustrates the several novel features of the system by demonstrating a typical waveform of one sampling cycle. It is shown that in this embodiment the sampling period consists of three different ranges. First, a marker signal 1 which initiates each new period, second, a range for interval modulation in which one pulse is allotted to each channel participating in the system and, third, a range for transmitting information by any other pulse modulation system, for example by pulse code modulation. It is one of the novel features of the system to transmit only the most probable symbols or signal values in pulse interval modulation. In this connection we may call a symbol any one of the possible characters producible by a discrete information source participating in the system, for example, a letter of the alphabet or one of the figures from 0 to 9.

It is well known that in the English language, for example, the letter "e" has the highest probability. But also continuous sources show a remarkable unequality in the probability distribution of the possible amplitude levels.

To continue the explanation of Fig. 1, we may assume that we use quantized time intervals in the interval modulation range, the minimum distance between two adjacent pulses discernible by the system has been called a time quantum 2. All the time quanta are marked on the time axis of Fig. 1 by small vertical lines. The interval 3 contains four time quanta, which express the instantaneous modulation value of channel 1; channel 2 is represented by the interval 4, representing 3 time quanta and so on until the interval between pulse 10 and pulse 11 involving 4 time quanta represents the *n*th channel of a multiplex system comprisig *n*-channels.

If we try to keep the total extension of the interval modulation range in practicable limits, we have to restrict the maximum number of time quanta tolerable for one channel interval to a small integer number, for example to 8. In this case it is profitable to express the most probable seven symbols or signal values by seven out of the eight possible interval lengths. The eighth possibility is reserved for an indication of the fact that the instantaneous character or signal value to be transmitted is not amongst these seven selected possibilities. In this case we may transmit the symbol or signal value in the third range, for example by ordinary PCM.

Assume in Fig. 1 a code which allots an interval of 1 time quantum to the most probable case in speech transmission, i.e. zero signal. The second highest probability may, for eaxmple, be found for any selection out of the set of signal values larger than 7 quanta steps, which may be transmitted by PCM in the third range. The respective channel interval will then be characterized by two time quanta. An interval of three time quanta should represent the case of third highest probability, which for example might be the amplitude level "one," or in other cases a certain medium amplitude level. Continuing this system we have to arrange a code up to the case of the eighth highest probability for which the channel interval will comprise 8 quanta steps.

In Fig. 1 we see that the second case is represented by the intervals between the pulses 6 and 7 (3rd channel) and between the pulses 8 and 9 (7th channel.) The first case (zero signal) is to be seen in the 5th and 6th channel interval. The PCM groups 12 and 13 therefore belong to the 3rd and 7th channels. By observing the cases with two time quanta, counting their positions and storing this information the receiver is in a position to select the PCM signals and to direct them with special switching circuits to the correct channels. The beginning of the PCM range can be correctly determined at the receiver by counting all the pulses in the second range.

It is evident that the system described above is a redundancy reducing system as it associates with the symbol or signal value of highest probability the case of lowest transmission capacity (shortest channel interval). As a fully quantized system it can be kept free of noise and disturbances and the number of quanta steps can be raised to any high value, as only symbols or signal values of lower probability will be transmitted in the third range, preferably with PCM.

It is also evident that embodiments of the system are not restricted to the quantized version, nor is it essential to use PCM in the third range, but any other pulse modulation system could likewise be used.

If it might be preferable, in a certain application to avoid the allotment of a particular quantized channel interval to the cases where the information is conveyed in the third range, it is also possible to identify the additional pulses or pulse groups transmitted in the third range by adding channel identification signals to each pulse or group, similar to the ones suggested in United States Patent No. 2,676,202.

In connection with certain groups of information sources we might prefer to transmit the change of the instantaneous value of the input waveform from sample to sample rather than to transmit the instantaneous value itself. It will be useful in such cases to allot the shortest intervals to changes of one, two, etc., quanta regardless of the sense of the change. The indication of the sense may then be given in one of the following manners:

(1) A particular signal may be produced at the transmitter and the receiver will be selective to this signal. The signal may indicate the sense of amplitude change directly, in which case two different varieties of signals are required. The signal also may merely indicate an alteration of the sense of amplitude change in which case a single type of signal is sufficient, provided the correct sense or the full amplitude value is transmitted at the beginning of any new transmission and preferably also at regular intervals within a transmission for checking purposes. Such particular signals can be formed by reserving one of the quantized time intervals in the second range for this purpose or by transmitting it in some coded form in the third range.

(2) An additional signal can be given in the third range, leaving all intervals in the second range for the signals of highest probability.

(3) It may be agreed by a-priori information between transmitter and receiver that whenever a zero signal is transmitted, it means a change in the sense of the waveform slope. In this case means are required which produce a zero signal whenever the waveform has a maximum or minimum. If the waveform has zero value or in a differential system has a constant value the transmitter has to produce alternatively zero signals and signals for a change of one amplitude step. This naturally will produce in the receiver a nearly constant signal value of a saw tooth form with a peak value of one amplitude level.

It has been demonstrated so far that at least two "service signals" which do not represent directly any sample of the waveform, will have rather high probability. The first was the indication that the actual sample will follow in PCM or any other convenient modulation system in the third range. The second was the indication of the sense of amplitude change of the input waveform. In a particular communication system, for example in telemetering systems, it might be practicable to provide for more such service signals. They may indicate changes of a code, or an input source or of a scale at a meter, etc. In such cases we may allot the symbol or signal value with highest probability to a channel transmission interval of the shortest possible time difference between adjacent pulses. We called this time difference already one time quantum.

It may be the case that one of the service signals may have even a higher probability than this most probable symbol or signal value, whence we may allot an interval of one time quantum to this service signal. For most information sources however we may assume that zero signal or at least zero change i.e. constant signal, will have highest probability. We then may allot to the symbol or signal value of second highest probability an interval of two plus $n_1$ time quanta, wherein $n_1$ indicates the number of service signals which we may consider to have higher probability than the symbol or signal value of second highest probability. Naturally, $n_1$ has to be a positive, integer number.

Continuing to arrange service signals and symbols or signal values of the waveform in a sequence of decreasing probability, we may allot to the symbol or signal value of $k$th highest probability an interval with $k+n_{k-1}$ time quanta, where $n_{k-1}$ is the largest number of service signals for which space is allotted in this redundancy reducing code.

Finally, it may be mentioned that the transmission system can work on a single error detecting basis, whenever we provide at the receiver means to count all the channel pulses in the second range as their number must be constant and equal to the number of channels connected to the system.

Figure 2:
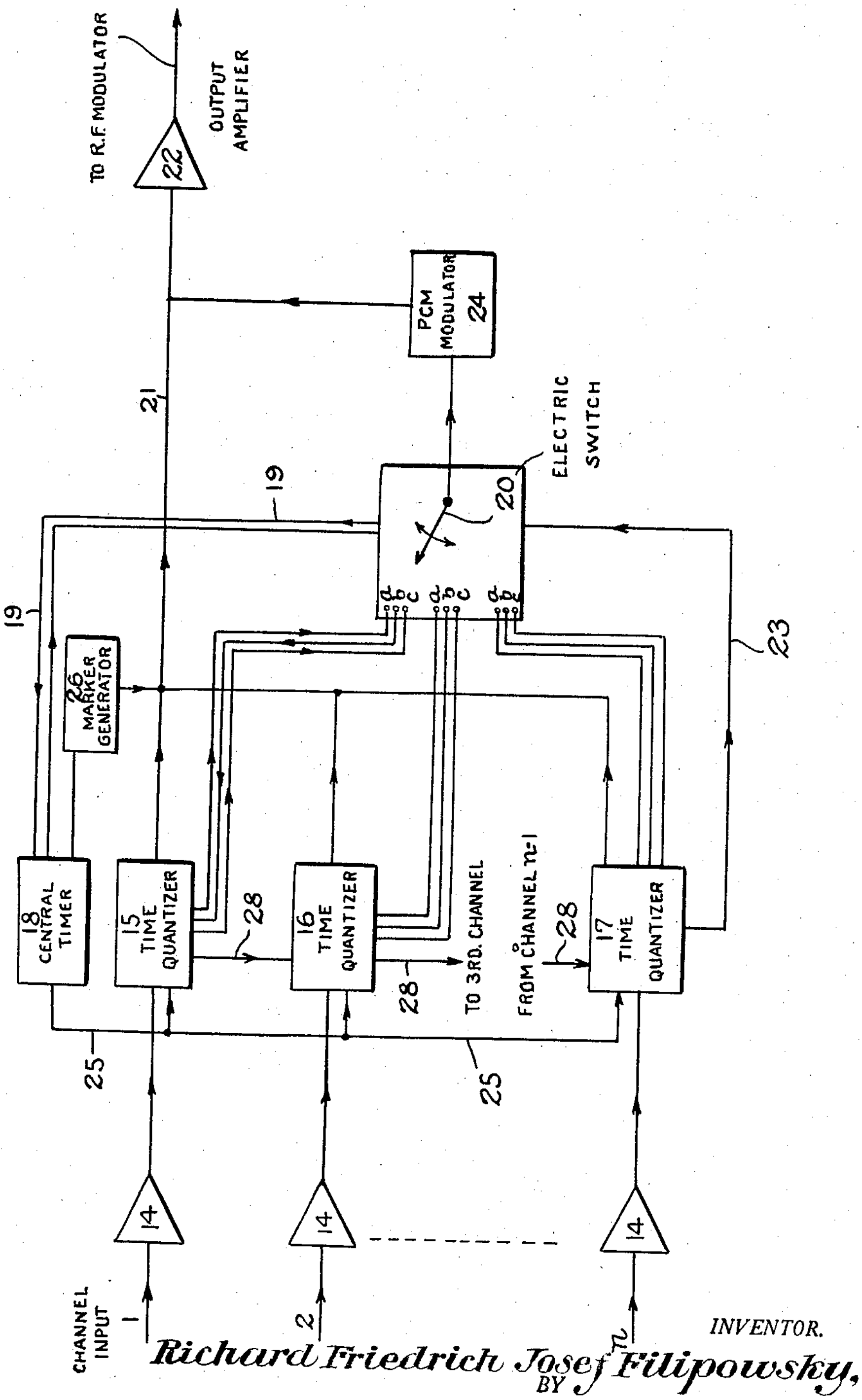
Fig. 2 is a block schematic diagram of the multiplexing equipment at the transmitting side.
Figure 3:
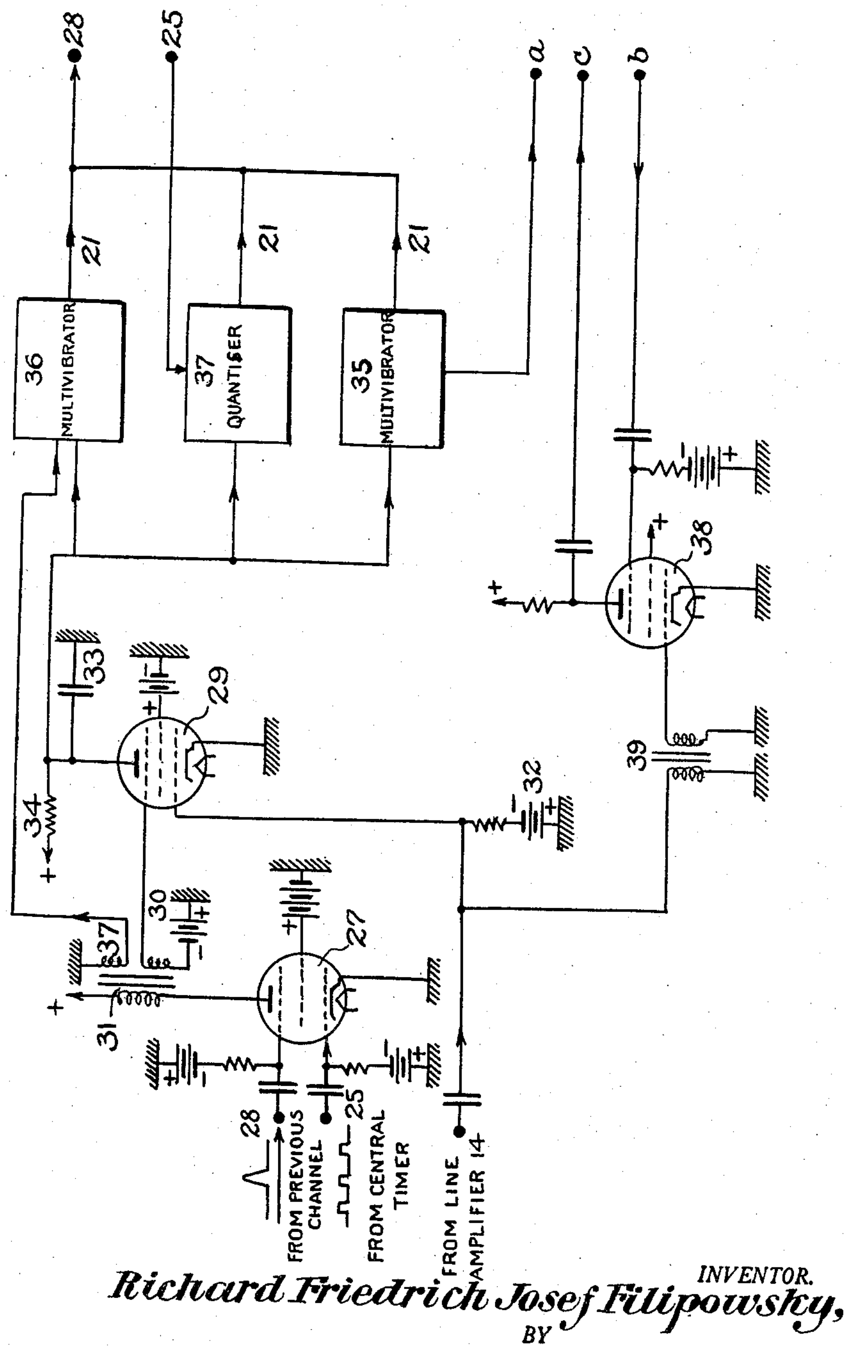
Fig. 3 is a schematic diagram of a time-quantizer.

Figure 2 is a block schematic diagram of the multiplexing equipment according to one special embodiment of the invention, featuring a waveform according to Fig. 1. Fig. 2 shows at the left side $n$-channel inputs leading to $n$ line-amplifiers 14, followed by $n$ time-quantizers 15, 16, . . . 17. Details about these time-quantizers are shown in Fig. 3. A central timer 18 triggers either in periodical intervals or after receiving over connection 19 first, a signal from switch 20, then the marker generator 26 and thereafter the time quantizer 15 of channel 1. The marker signal is forwarded over 21 to 22. The time quantizer 15 takes a sample of channel 1, determines its amplitude value and produces a channel pulse over connection 21 after a prescribed number of time quanta. Simultaneously with this channel pulse, time quantizer 15 forwards a trigger pulse to time quantizer 16 of channel 2, causing the latter to take a sample of channel 2. Again this time quantizer 16 will forward a channel pulse over connection 21 to the out-put amplifier 22 after a prescribed number of time-quanta. This procedure continues over all $n$-channels, until the time-quantizer 17 of the $n$th channel has forwarded its channel pulse over connection 21 to output amplifier 22. Simultaneously with this last pulse of the interval modulation range time-quantizer 17 sends a trigger pulse over connection 23 to the electronic switch 20. The latter has three terminals (contacts) per channel $a$, $b$ and $c$. It receives over the $a$ terminals special signals, for example, specified D.C. values, as an indication that the respective channels require a modulated pulse (or pulse group in case of PCM) in the third (asynchronous) interval (see Fig. 1). These special signals will be stored until the switch has finished its operation. Over the $b$ terminals the switch forwards sampling pulses at the correct instants, when a sample can be accommodated within the third interval. Over the $c$ terminals the samples return from the respective time quantizers and are immediately connected by the switch 20 to the pulse modulator 24. The latter can operate in any of the known pulse modulation systems, preferably in pulse code modulation (PCM). The modulated pulses leave the modulator immediately and follow the channel pulses of the PIM train over connection 21 to the output amplifier 22.

The electronic switch can be very similar to one of the switches described in U.S. Patent 2,676,202 or to the automatic auction switch described in a copending patent application.

The central timer 18 delivers over connection 25 a continuous pulse series of gating pulses with a repetition period equal to one time quantum.

Referring to Fig. 3, which is a schematic diagram of a typical time-quantizer, there is a gating tube 27, which is gated by the continuous pulse series from the central timer arriving over connection 25 (Fig. 2) and by the special trigger pulse arriving over two connections 28 from the previous time quantizer. The plate circuit of tube 27 can only be active when both pulses coincide in time. If this is the case sampling tube 29, which is normally blocked at the third grid, by the negative bias of battery 30, receives a positive opening pulse over transformer 31, producing a plate current, proportional to the instantaneous value of the channel signal, operating at the first grid of tube 29. This grid is biased beyond cut-off by battery 32. This negative bias is carefully adjusted to permit the first amplitude quantum, to produce a small plate current, whenever the quantizer is triggered.

The larger the signal value, the stronger the plate current until plate current saturation may be reached at a level corresponding to a PIM interval of nine time quanta. This saturation current should discharge the capacitor 33 to a rather low value, during the sampling time of tube 29. At this low potential of 33 or at any lower potential, the multivibrator 35 should be triggered and produce a pulse exactly two time quanta after the previous channel pulse. According to the standards assumed in Fig. 1, this would indicate to the receiver, that an accurate sample follows in the third range.

In Fig. 1 we see this procedure in the third and seventh channels. Simultaneously with this channel pulse over connection 21 the multivibrator 35 forwards a signal over connection *a* to switch 20, to reserve a transmission interval in the third range. Multivibrator 36 will be simultaneously triggered with tube 29, unless it is disabled by a reduced potential across capacitor 33. Only in case capacitor 33 does not change its potential, i.e. in the case of zero signal at the first grid of tube 29, multivibrator 36 will not be disabled and will produce a channel pulse over connection 21 exactly one time quantum after the previous channel pulse.

Whenever capacitor 33 assumes a potential between the maximum and minimum value, the amplitude quantizer 37 produces over connection 21 a channel pulse exactly three, four, five, . . . eight time quanta after the previous channel pulse, according to the value of the input signal. To secure this exact time quantization, a continuous pulse series is received over connection 25 from the central timer 18 (Fig. 2).

Tube 38 finally is a special sampler tube, which is normally blocked at the third grid, but produces a PAM sample, whenever a sampling pulse is received over terminal *b*. The PAM sample is returned over terminal *c* to the switch 20 (Fig. 2). Tube 38 receives the input signal over transformer 39 at its first grid.

Figure 4:
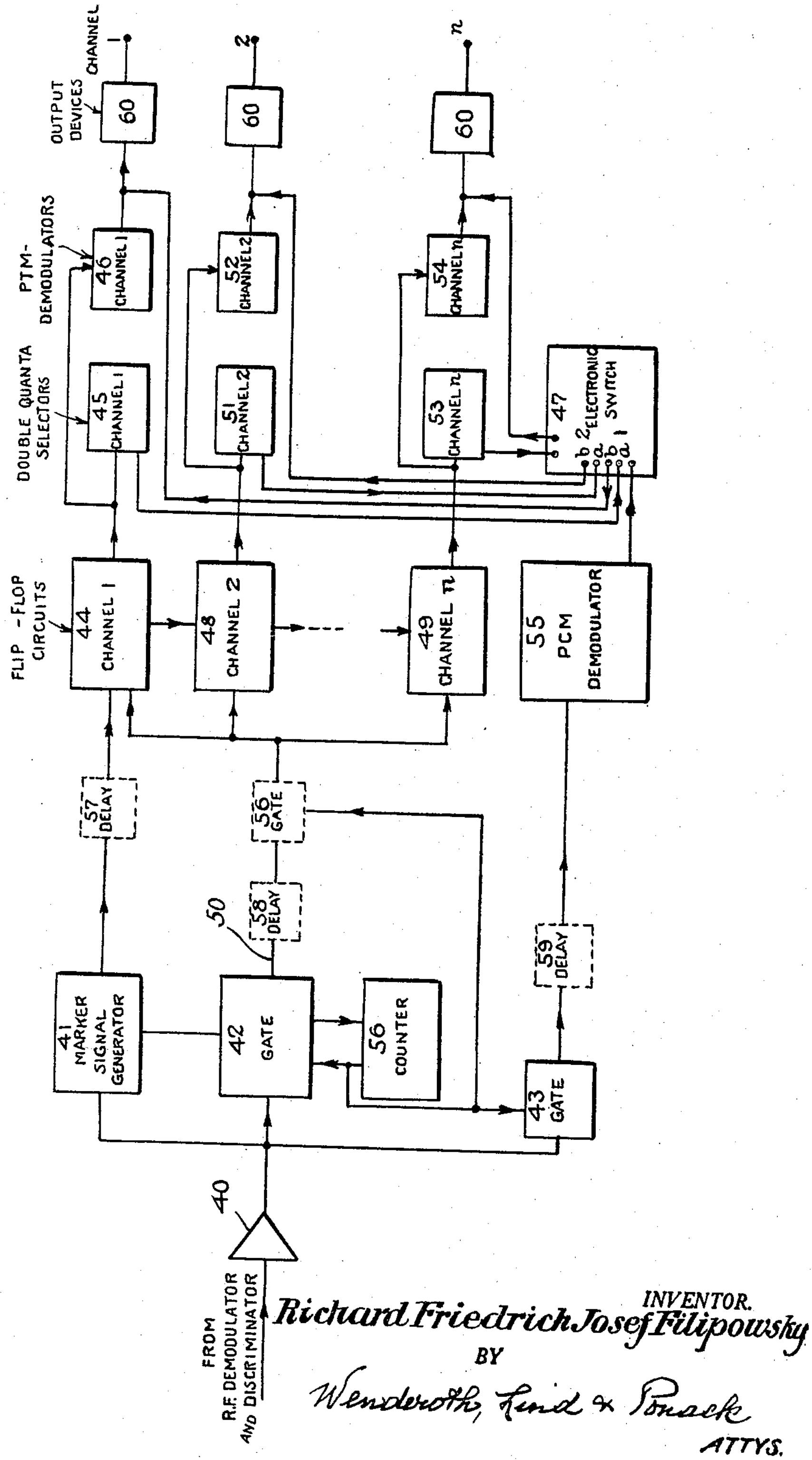
Fig. 4 is a block schematic diagram of the channel distributing equipment at the receiving side.

Referring to Fig. 4, there is a video amplifier 40 at the input of the channel distributing equipment. It feeds the multiplex signal in parallel to the marker signal selector 41, the first gate 42 and the second gate 43. The marker signal selector 41 selects the marker signal 1, in Fig. 1, and triggers thereafter gate 42 and the flip-flop circuit of channel one, 44. The latter is returned to its normal state by the first channel pulse (5 in Fig. 1), which is passed by the gate 42. Thus it produces a pulse equal in width to the number of time quanta transmitted by interval modulation during the interval for channel one. The output of flip-flop 44 leads simultaneously to a "Two-quanta selector" 45 and a PTM-demodulator 46. The latter converts pulses of 3, 4, . . . 8 quanta duration to the respective amplitude modulated samples. The former responds merely to pulses of two quanta width, in which case a special signal is forwarded over terminal *a* to the electronic switch 47.

Flip-flop circuit 48 is triggered by the trailing edge of the pulse produced in 44. It is returned to its normal state by the next pulse arriving over connection 50 from the gate 42. All the flip-flop circuits 44, 48, . . . 49 can only be affected by a pulse over 50, when they are in their second state, i.e. when they just have been triggered by the previous flip-flop in the given sequence. With flip-flop 48 are again two detection circuits associated: One two-quanta selector 51 and one PTM-demodulator 52, which is only responsive to pulses of 3 to 8 time quanta width.

All the two-quanta selectors are connected to the terminals *a* of the electronic switch 47. Each channel has the same combination of circuits (flip-flop, two-quanta selector, PTM-demodulator) until channel *n* may be seen with flip-flop 49, two-quanta selector 53 and PTM-demodulator 54. This last flip-flop triggers the PCM-demodulator 55, which receives the modulated pulses from the third range (12, 13, . . . in Fig. 1) as soon as gate 43 has been opened. The latter may be activated by the output of a counting circuit 56, which checks the number of pulses in the second range (PIM-range). This counter may also operate as a single-error detecting device and it can cause the rejection of a complete pulse train. Whenever the number of channel pulses in the PIM range is incorrect, i.e. whenever one pulse has been lost or one additional disturbance is simulating a surplus pulse. In this case provision has to be made for a third gate 56, and for three delay networks 57, 58, and 59, as the error can be verified only after the arrival of the last PIM pulse, whereas the operation of all the channel flip-flop has to start at the arrival of the first PIM-pulse.

Each channel has finally an out-put device 60 with low-pass characteristic. In one special feature of the invention, these out-put devices will also comprise a storage system and means to combine any stored sample with the next one to be received and further means to replace the previously stored sample by said combined sample.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

What I claim is:

1. In an electric multichannel system operating in time division, comprising means for generating marker signals, means for generating channel pulses and means for arranging said marker signals and channel pulses to pulse trains consisting each of one marker signal followed by a series of channel pulses, one for each channel, means to modulate the interval between the marker signal and the first channel pulse by the information signal of the first channel, means for modulating the interval between the first and the second channel pulse with the information of the second channel, means for modulating each of the further intervals between channel pulses with the information of one of the remaining channels, such that the information of the *k*th channel will modulate the interval between the $(k-l)$th and the $(k$th) channel pulse, means to transmit said pulse trains over the transmission medium, means to identify at the receiving side the marker signal, means to start a channel distributing switch by said marker signal and operate it by the following pulses and means to detect each modulation interval and restore the original information signal in each channel output, the combination comprising means to limit the modulation range of each channel to a pre-set peak value of said modulation interval, means to produce for any channel a predetermined fixed value of said interval whenever the instantaneous information signal can not be transmitted within said modulation range, means to generate additional pulses for each such channel which within a particular pulse train can not transmit its instantaneous information signal, means for modulating said additional pulses in pulse code modulation, means for transmitting them in time division after the last channel pulse but before the next marker pulse, means at the receiving side to identify said predetermined fixed modulation intervals, means to detect said additional pulses and means to distribute them to the correct channel outputs.

2. In an electric multichannel system as claimed in claim 1, wherein said means for identifying each of said additional pulses comprise electric circuits producing special channel marker signals preceding said additional pulses, means at the receiving end to identify said channel marker signals and means to direct the following additional pulses to the correct demodulator and channel output.

3. In an electronic multichannel system as claimed in claim 1, wherein said means for generating marker signals produce said marker signals periodically with a period larger than the interval between the marker pulse and the last of the channel pulses, comprising in each channel means for producing a voltage proportional to the change of the information signal between any two consecutive sampling instants of each channel, means to compare all the values of said voltages, indicating the change of the information signal in each channel, means to select only those channels for transmitting their information over said additional pulses in pulse code modulation which produced higher voltages that any one of those channels not selected so far and to continue this selection process until the interval between the last channel pulse and the next marker pulse is completely filled with such additional pulses in pulse code modulation.

4. In an electronic multichannel system as claimed in claim 1, comprising in each channel at the transmitting side means to derive a voltage proportional to the absolute difference of the information signal between any two sampling instants, means to select either the information signal itself or said difference voltage for transmission during any of said pulse trains, means to transmit a particular signal to the receiver whenever in a particular channel a change between these two alternatives will take place, means to indicate to the receiver the polarity (sense) of said difference of the information signal between any two sampling instants, comprising further at the receiving side in each channel means to store the last information signal, means to receive and detect said particular signal indicating a switch between said two alternatives, means to receive and detect said polarity indication and means to combine said last stored information signal in correct polarity with said difference voltage whenever this alternative is used.

5. In an electronic multichannel system as claimed in claim 1 wherein said means to transmit said particular signal indicating any switch between said two alternatives comprise means to produce a modulation interval of a predetermined number of time quanta in place of the information carrying modulation interval between the corresponding channel pulses whenever a switch to the one of the two alternatives takes place and a modulation interval of a different predetermined number of time quanta whenever a switch to the other of the two alternatives takes place and wherein said means to receive and detect said particular signal are responsive exclusively to these two predetermined numbers of time quanta.

6. In an electronic multichannel system as claimed in claim 1 comprising means at the receiving side for counting the number of said channel pulses in each pulse train and rejecting the information from any such train which has more or less channel pulses than exactly one for each channel.

7. In an electrical multichannel system as claimed in claim 4, wherein said means to indicate the sense of the signal change comprises an electric circuit producing a particular signal for an interval of a predetermined time quanta, whenever there is an alteration in the sense of signal change in a particular channel, and means at the receiver to demodulate the particular signal and to cause the correct sense of signal change in the receiver.

8. In an electrical multichannel system as claimed in claim 4, wherein said means to indicate the sense of the signal change comprises an electric circuit which gives zero change signal prior to any alteration in the sense of the signal change and expresses a constant signal by alternately giving zero change and one quantum change, and means at the receiver to cause the output signal altering its sense of signal change, whenever a zero-change signal is received.

9. In an electric multichannel system as claimed in claim 1, wherein said means for identifying each of said additional pulses comprise electric circuits producing a particular signal of a plurality of time quanta, at the correct instant in place of one sample of the respective channel, means at the transmitter to arrange said additional pulses in the same sequence as the channels are scanned, means at the receiver to count said particular signals and to identify positions in the sequence and means to select according to said counting action the individual additional pulses and direct them to the correct channel.

10. In an electric multichannel system as claimed in claim 1, wherein said means for identifying each of said additional pulses comprise electric circuits producing special channel marker signals preceding said additional pulses, means at the receiving end to identify said channel marker signals and means to direct the following additional pulses to the correct demodulator and channel output.

References Cited in the file of this patent

UNITED STATES PATENTS

| | | |
|---|---|---|
| 2,495,739 | Tabin et al. | Jan. 31, 1950 |
| 2,662,116 | Potier | Dec. 8, 1953 |